United States Patent
Carlough et al.

(10) Patent No.: US 10,572,223 B2
(45) Date of Patent: *Feb. 25, 2020

(54) PARALLEL DECIMAL MULTIPLICATION HARDWARE WITH A 3X GENERATOR

(71) Applicant: International Business Machines Corporation, Armonk, NY (US)

(72) Inventors: Steven R. Carlough, Poughkeepsie, NY (US); Michael Klein, Schoenaich (DE); Michael K. Kroener, Ehningen (DE); Silvia M. Mueller, Altdorf (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/299,337

(22) Filed: Mar. 12, 2019

(65) Prior Publication Data
US 2019/0212983 A1  Jul. 11, 2019

Related U.S. Application Data

(63) Continuation of application No. 15/827,761, filed on Nov. 30, 2017.

(51) Int. Cl.
| G06F 7/491 | (2006.01) |
| G06F 7/544 | (2006.01) |
| G06F 7/487 | (2006.01) |

(52) U.S. Cl.
CPC .......... *G06F 7/4915* (2013.01); *G06F 7/4876* (2013.01); *G06F 7/5443* (2013.01)

(58) Field of Classification Search
CPC ..... G06F 7/4915; G06F 7/4876; G06F 7/5443

USPC ......................................... 708/624
See application file for complete search history.

(56) References Cited

U.S. PATENT DOCUMENTS

| 7,062,526 B1 | 6/2006 | Hoyle |
| 7,136,888 B2 | 11/2006 | Rumynin et al. |
| 7,912,890 B2 | 3/2011 | Cornea-Hasegan |
| 2005/0010631 A1 | 1/2005 | Carlough et al. |

(Continued)

FOREIGN PATENT DOCUMENTS

WO  2014183195 A1  11/2014

OTHER PUBLICATIONS

Balasundaram; "High Speed Multiplication Using BCD Codes for DSP Applications"; IJARTET; vol. 2, Issue 1; Jan. 2015; 6 Pages.

(Continued)

*Primary Examiner* — Tan V Mai
(74) *Attorney, Agent, or Firm* — Cantor Colburn LLP; William Kinnaman (57) ABSTRACT

A method to produce a final product from a multiplicand and a multiplier is provided. The method is executed by a parallel decimal multiplication hardware architecture, which includes a 3× generator, at least one additional generator, a multiplier recoder, a partial product tree, and a decimal adder. The 3× generator, the at least one additional generator, and the multiplier recoder generate decimal partial products from the multiplicand and the multiplier. The partial product tree executes a reduction of the decimal partial products to produce two corresponding partial product accumulations. The decimal adder adds the two corresponding partial product accumulations of the decimal partial products to produce the final product.

20 Claims, 6 Drawing Sheets

(56) References Cited

U.S. PATENT DOCUMENTS

2010/0146031 A1    6/2010    Erle et al.
2012/0011181 A1    1/2012    Samy et al.

OTHER PUBLICATIONS

Carlough, Steven R. et al. "Parallel Decimal Multiplication Hardware With a 3X Generator", U.S. Appl. No. 15/827,761, filed Nov. 30, 2017.

IBM "List of IBM Patents or Patent Applications Treated as Related (Appendix P)"; Filed Mar. 12, 2019, 2 pages.

Ingle et al.; "Radix-10 Parallel Decimal Multiplier"; IJESS; vol. 1, Issue 3; 2012; pp. 17-24.

V'Azquez et al.; "A New Family of High-Performance Parallel Decimal Multipliers"; IEEE; 2007; 10 Pages.

| Decimal Number | SD radix-10 | |
|---|---|---|
| 0 | 0 | 0 |
| 1 | 0 | 1 |
| 2 | 0 | 2 |
| 3 | 0 | 3 |
| 4 | 0 | 4 |
| 5 | 0 | 5 |
| 5 | 1 | -5 |
| 6 | 1 | -4 |
| 7 | 1 | -3 |
| 8 | 1 | -2 |
| 9 | 1 | -1 |

FIG. 3

| Dec # | 4221 | 3x Dec | Tens Digit Carry Out 3x4221 | Ones Digit No Carry In 3x4221 | Ones Digit Carry In = 1 +1 Code | Ones Digit Carry In = 1 +2 Code | Carry Out To New Partial Product |
|---|---|---|---|---|---|---|---|
| 0 | 0000 | 0 | 0000 | 0000 | 0001 | 0100 | |
| 1 | 0001 | 3 | 0000 | 0011 | 0110 | 0111 | |
| 2 | 0010 | 6 | 0000 | 1010 | 1011 | 1110 | |
| 3 | 0011 | 9 | 0000 | 1111 | 1110 | 1111 | 2 |
| 4 | 1000 | 12 | 0001 | 0010 | 0011 | 0110 | |
| 5 | 1001 | 15 | 0001 | 1001 | 1100 | 1101 | |
| 6 | 1010 | 18 | 0001 | 1110 | 1111 | 1110 | 0 or 2* |
| 7 | 1011 | 21 | 0100 | 0001 | 010 | 0101 | |
| 8 | 1110 | 24 | 0100 | 1000 | 1001 | 1100 | |
| 9 | 1101 | 27 | 0100 | 1011 | 1110 | 1111 | |

|   | 0 | 1 | 2 | 3 | 4 | 5 | 6 | 7 | 8 | 9 |
|---|---|---|---|---|---|---|---|---|---|---|
| 3x / x-1 | 0 | 3 | 6 | 9 | 12 | 15 | 18 | 21 | 24 | 27 |
| 0 | 0 | 3 | 6 | 7 | 12 | 15 | 16 | 21 | 24 | 27 |
| 1 | 0 | 3 | 6 | 7 | 12 | 15 | 16 | 21 | 24 | 27 |
| 2 | 0 | 3 | 6 | 7 | 12 | 15 | 16 | 21 | 24 | 27 |
| 3 | 0 | 3 | 6 | 7 | 12 | 15 | 16 | 21 | 24 | 27 |
| 4 | 1 | 4 | 7 | 8 | 13 | 16 | 17 | 22 | 25 | 28 |
| 5 | 1 | 4 | 7 | 8 | 13 | 16 | 17 | 22 | 25 | 28 |
| 6 | 1 | 4 | 7 | 8 | 13 | 16 | 17 | 22 | 25 | 28 |
| 7 | 2 | 5 | 8 | 9 | 14 | 17 | 18 | 23 | 26 | 29 |
| 8 | 2 | 5 | 8 | 9 | 14 | 17 | 18 | 23 | 26 | 29 |
| 9 | 2 | 5 | 8 | 9 | 14 | 17 | 18 | 23 | 26 | 29 |

PARALLEL DECIMAL MULTIPLICATION HARDWARE WITH A 3X GENERATOR

DOMESTIC PRIORITY

This application is a continuation application of the legally related U.S. Ser. No. 15/827,761 filed Nov. 30, 2017, the contents of which are incorporated by reference herein in their entirety.

BACKGROUND

The present invention relates to parallel decimal multiplication hardware and more specifically, to a system and method of parallel decimal multiplication with a 3× generator.

Decimal multiplication is important for commercial applications. However, the difference in rounding operations between binary arithmetic and decimal arithmetic makes it hard to emulate decimal arithmetic in binary multiplication computer hardware. Conventional commercial decimal multiplication algorithms perform computations with digit-at-a-time multiplication to form partial products that are summed together. This digit-at-a-time multiplication requires many machine cycles and is considerably slower than current parallel decimal multiplication algorithms used in the binary multiplication computer hardware. Yet, current parallel decimal multiplication algorithms do not solve the issues with digit-at-a-time multiplication, as the current parallel decimal multiplication algorithms require significant increases in a number of partial product terms generated (as both of the operands are expanded), which also cause delays in the binary multiplication computer hardware.

SUMMARY

Embodiments of the present invention are directed to a method to produce a final product from a multiplicand and a multiplier. The method executed by a parallel decimal multiplication hardware architecture comprising a 3× generator, at least one additional generator, a multiplier recoder, a partial product tree, and a decimal adder. The method comprising generating, by the 3× generator, the at least one additional generator, and the multiplier recoder of the parallel decimal multiplication hardware architecture, decimal partial products from the multiplicand and the multiplier. The method comprising executing, by the partial product tree of the parallel decimal multiplication hardware architecture, a reduction of the decimal partial products to produce two corresponding partial product accumulations. The method comprising adding, by the decimal adder of the parallel decimal multiplication hardware architecture, the two corresponding partial product accumulations of the decimal partial products to produce the final product.

According to one or more embodiments, the above method for execution of the engineering change announcement can be implemented as a system, a hardware architecture, a computer program product, and/or a device.

Additional features and advantages are realized through the techniques of the present disclosure. Other embodiments and aspects of the disclosure are described in detail herein. For a better understanding of the disclosure with the advantages and the features, refer to the description and to the drawings.

DETAILED DESCRIPTION

In view of the above, embodiments disclosed herein may include a system, method, and/or computer program product (herein system) that provides a parallel decimal multiplication with a 3× generator.

Conventional decimal multiplication algorithms create multiples of a multiplicand (e.g., 1×, 2×, 3× . . . 9×), selects a multiple based on a digit of the multiplier, and then accumulates those multiples in a partial product accumulator consisting of a decimal adder. These digit-at-a-time techniques iterate across each digit of the multiplier and therefore perform slow.

Parallel decimal multipliers accumulate many partial products in parallel, however, they require the summation of many more terms. Furthermore, to perform decimal multiplication in parallel, the operands must be recoded into a 4221 notation, which generates additional partial product terms and a modified reduction tree (similar to binary multiplication with booth recoding but the reduction tree requires 5211 recoders).

The system herein utilizes a set of multiplicand multiples in the set (−5×, −4×, −3×, −2×, −1×, 0×, 1×, 2×, 3×, 4×, 5×) using multiplier digit recoding. This set of multiples eliminates the expansion of partial product terms when those terms are mapped to a 4221 and 5211 notation, and accumulated on a modified reduction tree. The generation of 0×, 1×, 2×, 4×, and 5× decimal multiples can be done quickly and efficiently. However, the generation of 3× terms are slow because it requires a carry chain to sum the terms.

The system herein captures carry terms from the 3× generator (also referred to as a carry vector, the value of the terms in the vector can be a 1 or 2) and forms a separate partial product. These carry terms can be summed together and encoded into a 4221 encoded value, which can be further routed into a reduction tree where the 4221 encoded value gets reduced with other partial product terms to form a final product. The encoded 3× term can also be adjusted such that the carry vector contains values that are always a value of 2. This requires the carry vector to be processed by a 5211 to 4221 converter before it is processed with the other 4221 partial products, but this simplifies the summation hardware that would otherwise have to process carry terms that can have a value of 1 or 2. For example, the system performs a capturing of carry terms for 3×3 and 3×6 (unsigned) cases, where a digit result is lowered by 2 and a bit for the separate carry term partial product is collected, the value of that bit always being 2.

Technical effects and benefits of the system include providing the 3× multiple generation with a carry chain to overcome problems with current parallel decimal multiplication algorithms, such as when generated carries collide with used bits in a next higher digit (i.e., resulting in a carry propagation). The technical effects and benefits of the system also include reducing a number of partial products by first doing a fast digit-wise multiplication of an operand and converting the operand into a 4221 notation as the operand is loaded into a partial product summation tree. Additionally, the system can simplify the operand by recoding the operand utilizing a −5 to +5 recoder, which also simplifies the generation of the digit-wise multiples (e.g., partial products). In turn, these partial products can then be summed together in a smaller tree of adder hardware designed for the multiplication of 4221 numbers.

Figure 1:
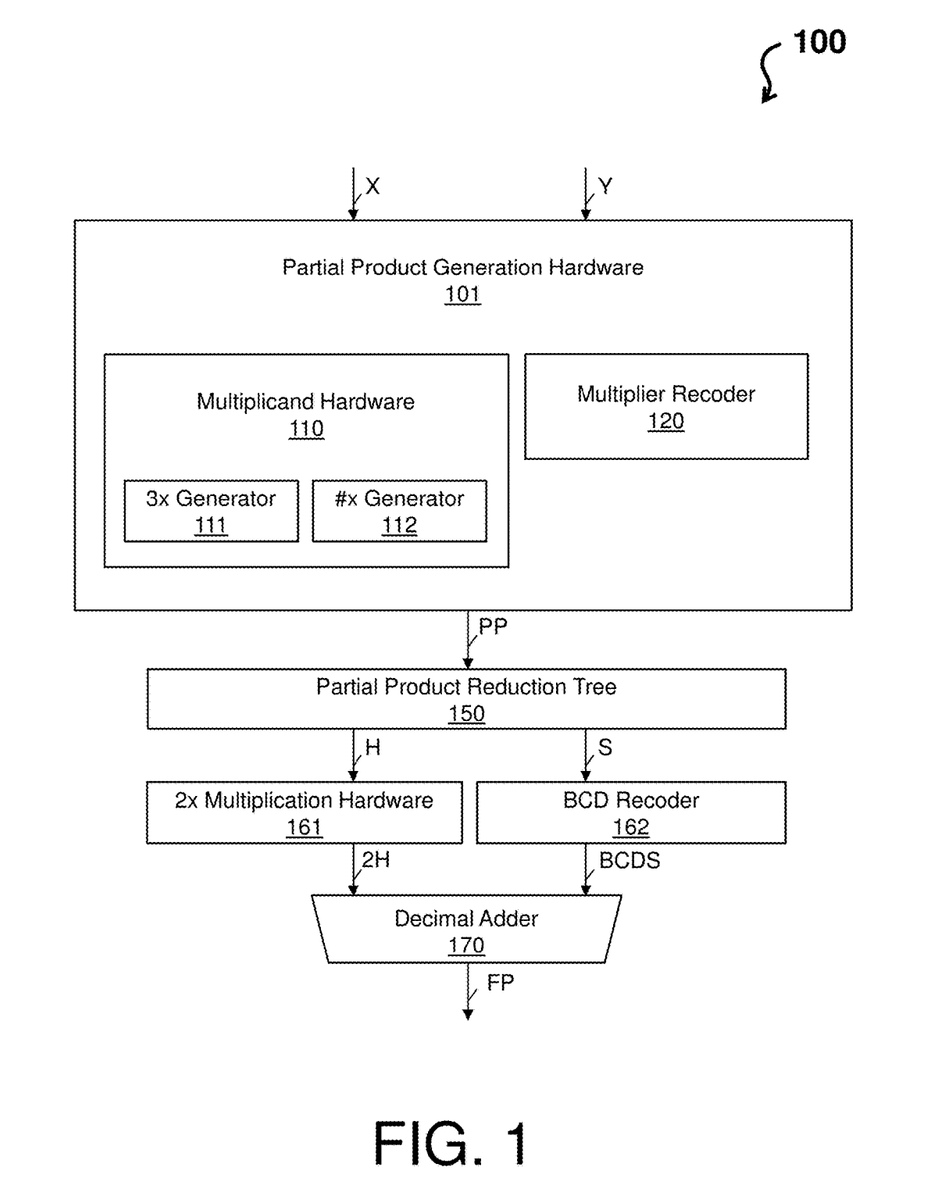
FIG. 1 depicts a block diagram of a parallel decimal multiplication hardware architecture with a 3× generator according to an embodiment of the present invention.

FIG. 1 depicts a block diagram of a parallel decimal multiplication hardware architecture 100 according to an embodiment of the present invention. As shown, the parallel decimal multiplication hardware architecture 100 comprises partial product generation hardware 101, which includes multiplicand hardware 110 (comprising a 3× generator 111 and a #× generator 112) and a multiplier recoder 120. The parallel decimal multiplication hardware architecture 100 further comprises a partial product reduction tree 150, 2× multiplication hardware 161, a binary coded decimal (BCD) recoder 162, and a decimal adder 170.

In an example operation, the parallel decimal multiplication hardware architecture 100 executes a generation of decimal partial products (e.g., see the PP arrow) coded in 4221 recoding from a multiplicand X and a multiplier Y (e.g., see the X and Y arrows). That is, a generation of partial products from the multiplicand X and the multiplier Y is performed by an encoding of the multiplier Y by the multiplier recoder 120 into signed-digit (SD) radix-10 digits. Within the multiplier recoder 120, each SD radix-10 digit controls a level of 5:1 muxes, which selects a positive multiplicand multiple (0, ×, 2×, 3×, 4×, 5×) coded in 4221 recoding. To obtain each partial product when a sign of the corresponding SD radix-10 digit is negative, a level of XOR gates of the multiplier recoder 120 inverts the output bits of the 5:1 muxes. Note that the #× generator 112 is representative of one or more generator that can produce corresponding ×, 2×, 4×, and 5× partial products (e.g., each of the one or more generator can be a small fast circuit that creates easy to compute multiples). Note that when the 3× multiplicand multiple (whether negative or positive) is selected in the multiplier recoder 120, the 3× generator 111 is utilized to produce the corresponding 3× partial product. The 3× generator 111 captures carry terms and forms a separate partial product (to avoid carries that collide with used bits in the next higher digit resulting in a carry propagation). The carry terms from 3× generator 111 are summed together into a 4221 encoded value which is routed into the partial product reduction tree 150 with the other partial product terms to be resolved into the final calculation, as further described with respect to FIG. 2.

Further, the parallel decimal multiplication hardware architecture 100 executes a reduction of the decimal partial products utilizing the partial product reduction tree 150 (e.g., to produce partial product accumulations H and S, as identified by the H and A arrows), executes a final BCD carry-propagate addition utilizing the 2× multiplication hardware 161 and the BCD recoder 162 to produce the partial product accumulations 2H and BCDS (e.g., see the arrows 2H and BCDS), and utilizes the decimal adder 170 to provide a final product (e.g., see the FP arrow). For instance, the partial products are reduced to two partial product accumulations S and H coded in 4221 recoding (as a number of digits for each column can vary) and added to produce the final product (e.g., see the H, S, and FP arrows). Before being added, the two 2d-digit operands S and H are processed. The processing of the two 2d-digit operands S and H can be performed in parallel. The two 2d-digit operand S is recoded by the BCD recoder 162 from 4221 recoding to BCD excess-6 (e.g., BCD value plus 6) to produce an operand BCDS (e.g., see the arrow BCDS). The partial product accumulation H is multiplied by 2× in the 2× multiplication hardware 161. The 2× multiplication hardware 161 can use a 4221 to 5421 digit recoder and a 1-bit wired left shift to obtain an operand 2H coded in binary coded decimal (e.g., see the arrow 2H). The decimal adder 170 is utilized for a final BCD carry-propagate addition. In accordance with one embodiment, the decimal adder 170 can be a quaternary tree adder based on conditional speculative decimal addition due having low latency and requiring less hardware than other alternatives. The final product FP is a 2d-digit BCD word given by FP=2H+BCDS.

Figure 2:
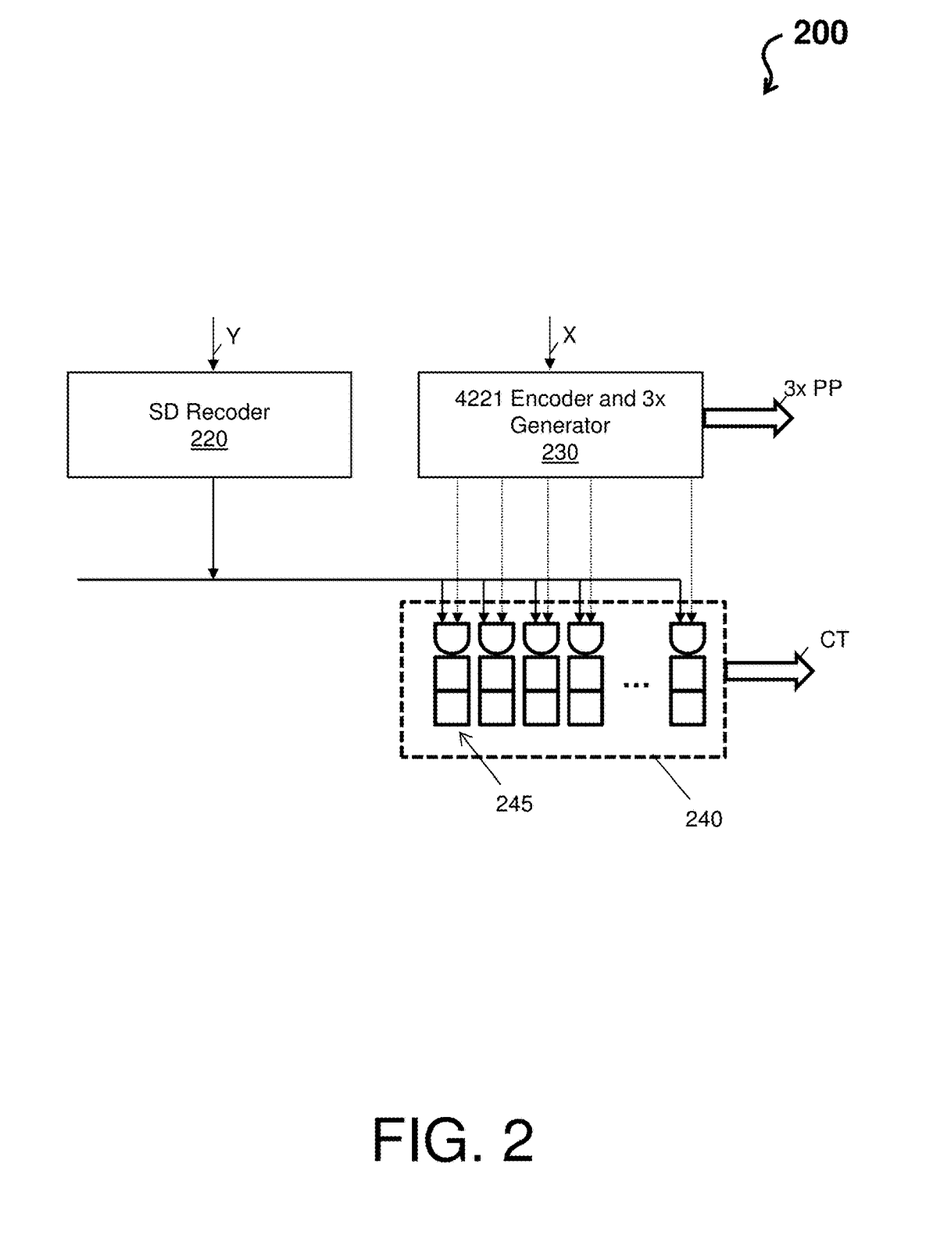
FIG. 2 depicts a block diagram of a signed-digit recoder and a 3× generator for a parallel decimal multiplication hardware architecture according to an embodiment of the present invention.

Turning now to FIG. 2, a block diagram of a parallel decimal multiplication hardware architecture 200 is depicted according to an embodiment of the present invention. The parallel decimal multiplication hardware architecture 200 is a granulated view of the parallel decimal multiplication hardware architecture 100. The parallel decimal multiplication hardware architecture 200 includes a signed-digit (SD) recoder 220 (e.g., multiplier recoder 120) and a 4221 encoder and 3× generator 230 (e.g., multiplicand hardware 110). The parallel decimal multiplication hardware architecture 200 also includes a carry term circuit 240 comprising a plurality of sub-circuits 245 for each special carry term. Note that the 4221 encoder and 3× generator 230 outputs the partial products including at least the 3× PP (e.g., a 17 Digit 3× Multiple minus propagated correction terms in 4221 notation). Note the carry term circuit 240 outputs the correction term CT (e.g., a four 34 digit propagated correction terms in 4221 notation).

Figure 3:
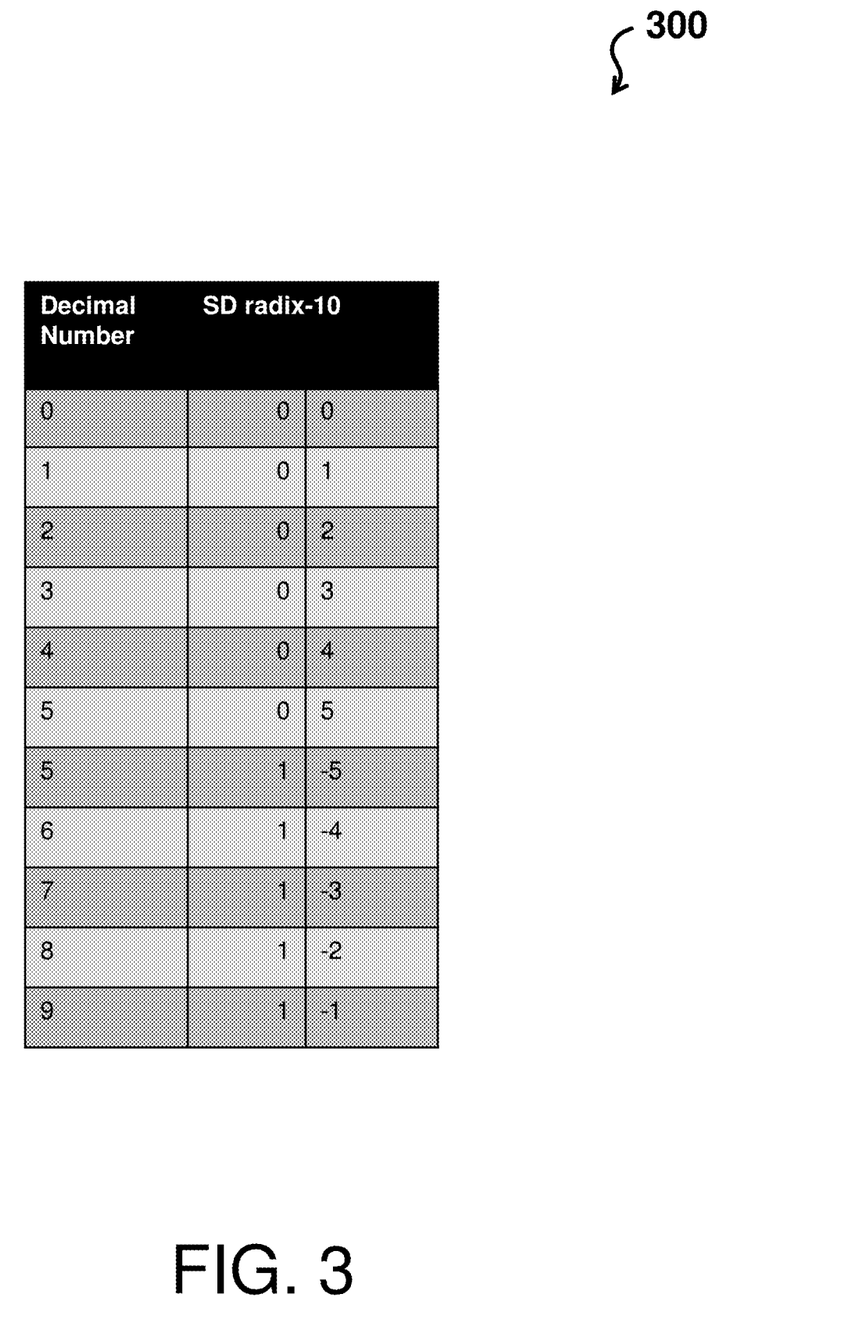
FIG. 3 depicts a table describing recoding operations of a signed-digit recoder of a parallel decimal multiplication hardware architecture according to an embodiment of the present invention.

The SD recoder 220 operates to recode each digit of the multiplier Y. FIG. 3 depicts a table 300 describing recoding operations of the SD recoder 220 of the parallel decimal multiplication hardware architecture 200 according to an embodiment of the present invention. The table 300 comprises three columns, where a first column is a decimal number and second and third columns show a recoding of the decimal number by the SD recoder. In accordance with one or more embodiments, the SD recoder provides SD radix-10 encoding where a '0' no increment to the next higher order digit and a '1' represents an increment to the next higher order digit. In this regard, decimals numbers '0' through '4' are recoded as '0' through '4' with a '0' for the addition to the next higher order digit (e.g., note rows 1-5 after the header row of table 300); decimals numbers '6' through '9' are recoded as '4' through '1' with a '1' for the increment to the next higher order digit (e.g., note rows 8-11 after the header row of table 300); and decimal number '5' can be represented as a negative or positive number (e.g., note rows 6-7 after the header row of table 300). For example, a 6 encoded as (1, −4) implies 10 minus 4, a 7 encoded as (1, −3) implies 10 minus 3, and so on.

Figure 4:
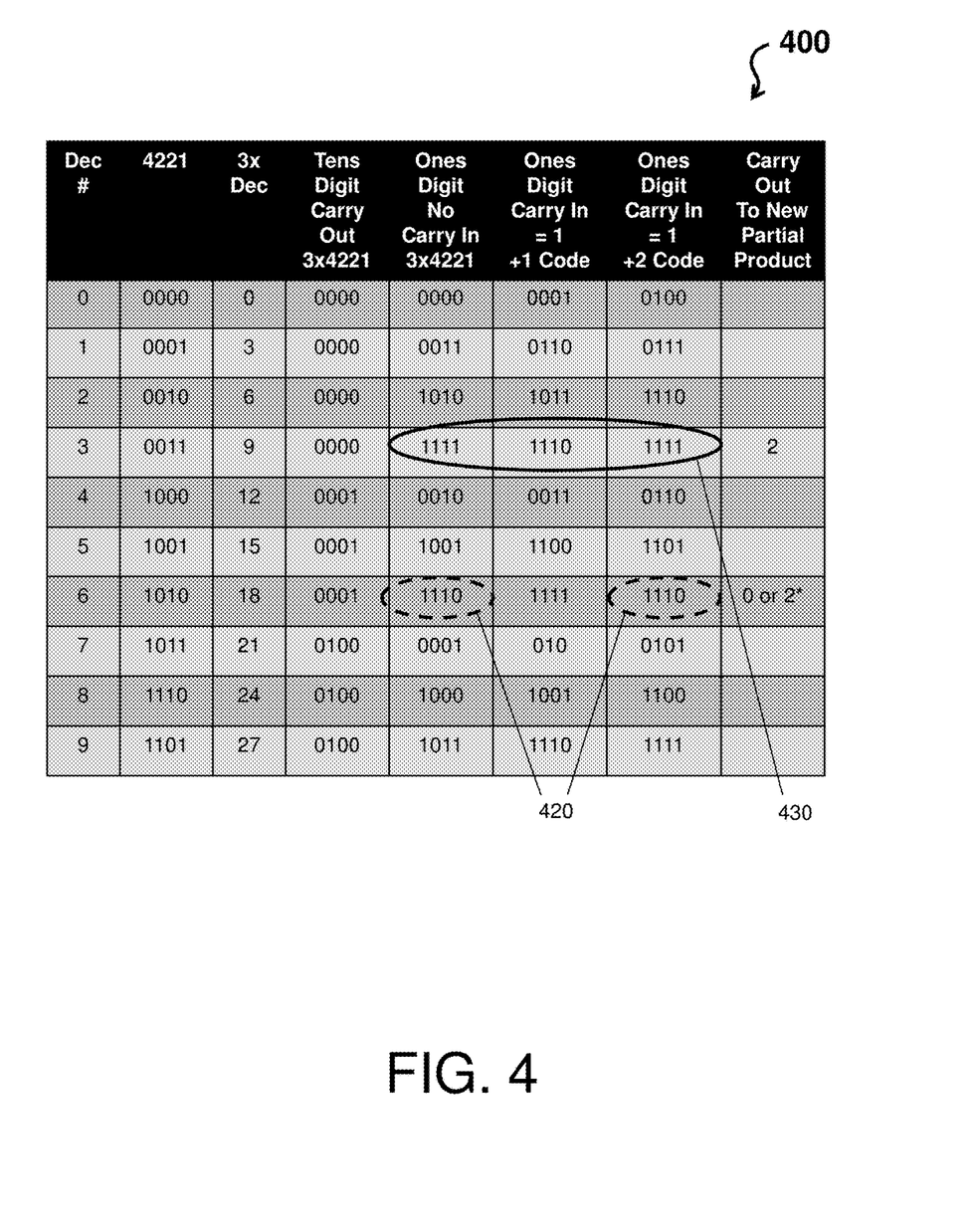
FIG. 4 depicts a table describing operations of a parallel decimal multiplication hardware architecture according to an embodiment of the present invention.

The 3× generator 230, multiple generator and 4221 encoder operates to encode each digit of the multiplicand X multiples for the partial product terms. FIG. 4 depicts a table 400 describing operations of the 4221 encoder and 3× generator 230 of the parallel decimal multiplication hardware architecture 200 according to an embodiment of the present invention. In general, table 400 shows how the 3× terms are formed for each case, depending on if there is a carry in or not. Note that a carry in can comprise a value of '1' or '2' into the next higher digit as the digit below it may have values as high as '27' (e.g., 3×9). The carry can actually be '29' with a carry in of '2'.

The table 400 comprises multiple columns, where a first column is a decimal number, a second column shows a 4221 encoding of the corresponding decimal number, and the third column shows a 3× multiplication of the corresponding decimal number. Further, column four of table 400 (e.g., the tens digit carry out) column shows the carry out into the next higher digit. Columns five, six, and seven (the ones digit columns) of table 400 show a 4221 encoded value of the low order digit for each case after the multiplication of 3 and with respect to the type of carry in. Column five shows no carry in, column six shows a carry in of '1,' and column 7 shows a carry in of '2.' Column eight of table 400 shows when a special carry term is formed up as a separate partial product with respect to certain decimal cases.

With respect to columns five, six, and seven, FIG. 4 also demonstrates three operational cases identified by a plurality of unmarked cells, cells highlighted by the circles 420, and cells highlighted by the circle 430. That is, the cells of columns five, six, and seven that are unmarked identify situations where the 4221 encoder and 3× generator 230 can resolve a carry in of a value of '1' or '2.' The cells of table 400 that are identified by the dashed circles 420 indicate that a carry in of '2' cannot be resolved and result in another carry out. The cells of table 400 that are identified by the solid circle 430 indicate a result of 3×3=9, which cannot be resolved by any carries (e.g., carry in of '1' or '2'). In the cases of the dashed circles 420 and the solid circle 430, a special carry term is formed as a separate partial product (shown in the last column). This special carry term can be considered a second 'ones column,' as it has the numeric weight of the ones digit and not the tens digits shown in column four of the table 400.

Note, in accordance with one or more embodiments, the special carry can always be '2.' For example, with a 3×9+ Carry_in of 1 case (see row four after the header row and column six), the ones digit is set to '8' with the special carry term of '2' rather than '9' with the special carry term of '1.' In this regard, 1-bit can be generated for every carry term generated (in this manner keeping track of the fact that it has a weighting of '2' rather than '1'). The technical effect and benefit is a significant simplification of the parallel decimal multiplication hardware architecture 100, as carry term can be sent to subsequent converters and adder trees like other carry terms generated during the summation of the partial product terms.

Figure 5:
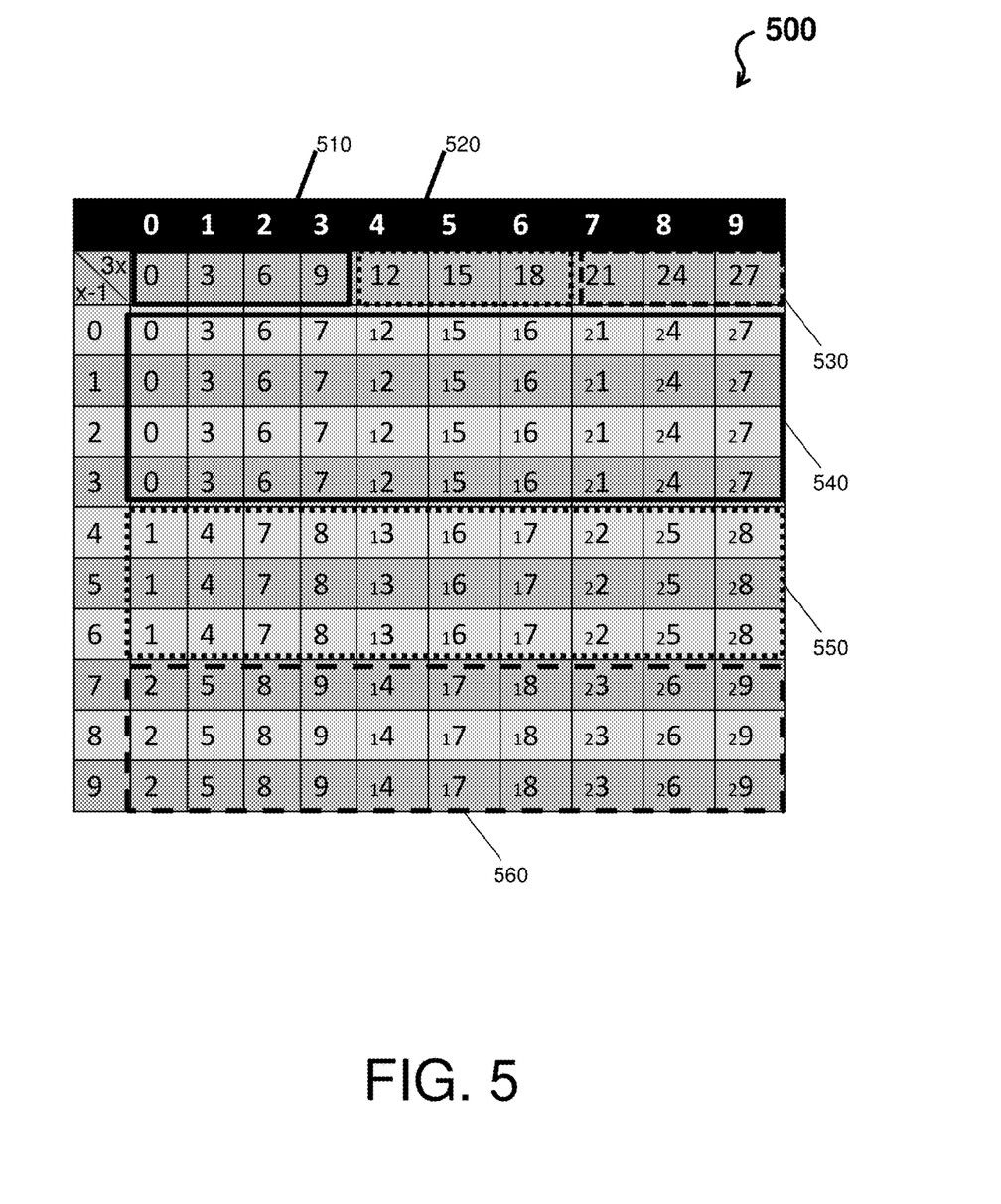
FIG. 5 depicts a table describing recoding operations of a 3× generator of a parallel decimal multiplication hardware architecture according to an embodiment of the present invention.

FIG. 5 depicts a table 500 describing recoding operations of the 3× generator of the parallel decimal multiplication hardware architecture (e.g., multiplicand hardware 110 of the parallel decimal multiplication hardware architecture 100) according to an embodiment of the present invention. The table 500 illustrates when a '1' or '2' will carry to the next digit for given a digit 'x.'

The recoding operations of the 3× generator observes two digits when computing a digit (scanning in overlapping groups of two digits). That is, the recoding operations of the 3× generator observes the current digit being tripled and the digit to the right (e.g., previous digit) to determine a carry in. The header row of table 500 depicts the decimal value. The second row of table 500 depicts the 3× value of the digit being tripled. The first column of table 500 depicts a previous digit, which will determine whether there is a carry in. For example, when the previous digit is a 0, 1, 2, or 3, then the 3× value is respectively 0, 3, 6, or 9 (e.g., see all 3× values highlighted by block 510) and the carry in is a 0. When the previous digit is 4, 5, or 6, then the 3× value is respectively 12, 15, or 18 (e.g., see all 3× values highlighted by dotted block 520) and the carry in is a 1. When the previous digit is a 7, 8, or 9, then the 3× value is respectively 21, 24, or 27 (e.g., see all 3× values highlighted by dashed block 530) and the carry in is a 2.

Thus, with the exception of columns 5 and 8, as shown in rows three through six of table 500 (see block 540), when the previous digit does not provide a carry in (due to the previous digit being a 0, 1, 2, or 3), then the decimal number is tripled. As shown in rows seven through nine of table 500 (see block 550), when the previous digit provides a carry in of '1' (due to the previous digit being a 4, 5, or 6), then the decimal number is tripled and the carry in of '1' is added. As shown in rows ten through twelve of table 500 (see block 560), when the previous digit provides a carry in of '2' (due to the previous digit being a 7, 8, or 9), then the decimal number is tripled and the carry in of '2' is added. Note that the ones digit remains after the adding and the tens digit is carried out (the smaller number preceding the ones digit represents the carry out).

Columns 5 and 8 of table 500 shows the tripling of the value 3 (which is 9) and 6 (which is 18) respectively. These two columns correspond to rows 5 and 8 respectively on FIG. 4, where it was discussed the external carry vector is set. This table shows an embodiment where the Carry Vector is always set for these columns and so their ones digit is adjusted accordingly based on the carry in. An alternative embodiment could have 9 is rows 3 to 6 of column 5 and 8 in rows 3 to 6 of column 8, and the Carry Vector would be set dependent of if the carry-in was a value of 2.

Figure 6:
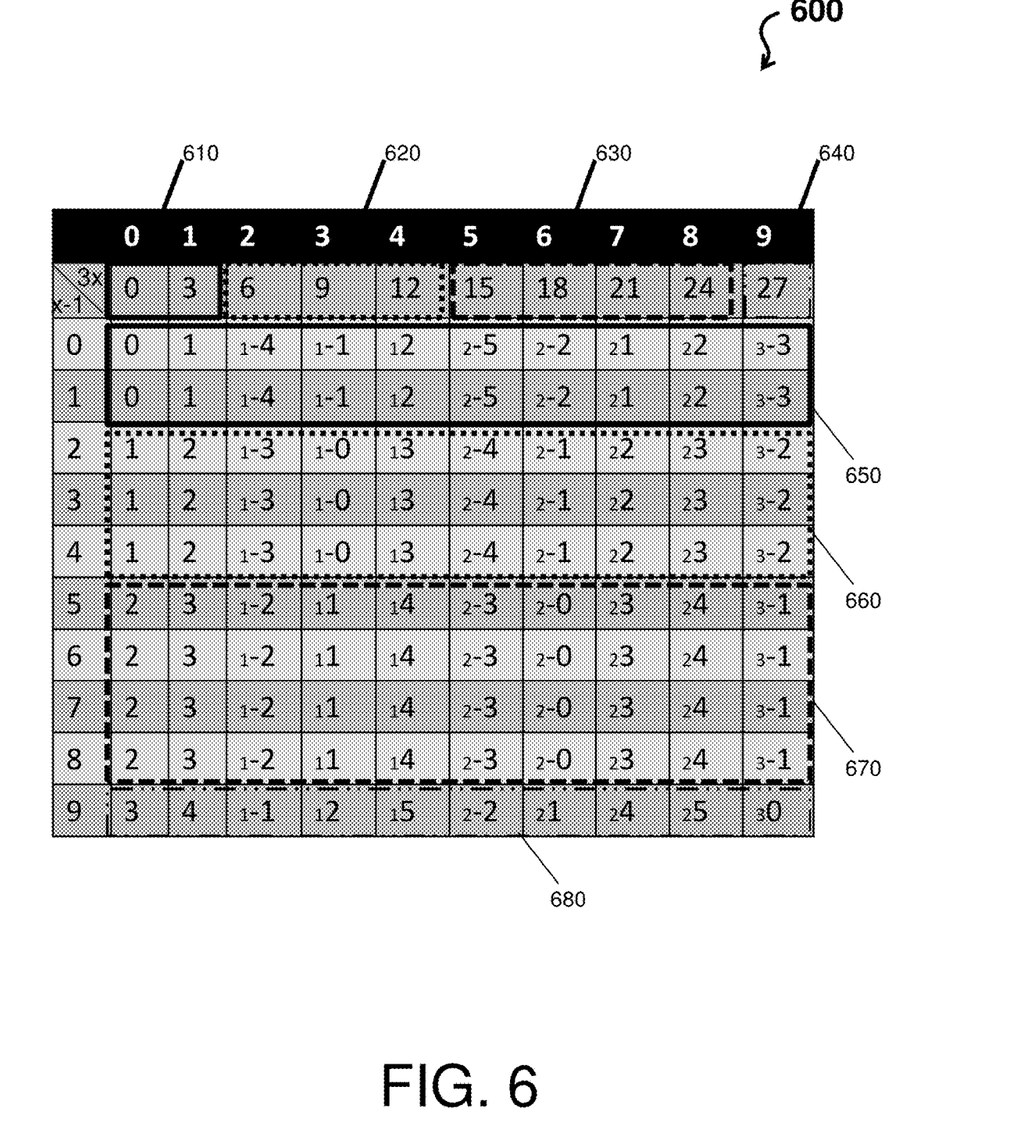
FIG. 6 depicts a table describing signed-digit recoding operations of a 3× generator of a parallel decimal multiplication hardware architecture according to an embodiment of the present invention.

FIG. 6 depicts a table 600 describing SD recoding operations of the 3× generator of the parallel decimal multiplication hardware architecture (e.g., multiplicand hardware 110 of the parallel decimal multiplication hardware architecture 100) according to an embodiment of the present invention. The table 600 illustrates when a '1,' '2,' or '3' will ripple to the next digit for given a digit 'x.'

The SD recoding operations of the 3× generator observes two digits when computing a digit (scanning in overlapping groups of two digits). That is, the SD recoding operations of the 3× generator observes the current digit being tripled and the digit to the right (e.g., previous digit). The header row of table 600 depicts the decimal value. The second row of table 600 depicts the 3× value of the digit being tripled. The first column of table 600 depicts a previous digit, which will determine whether there is a carry in. For example, when the previous digit is a 0 or 1, then the 3× value is respectively 0 or 3 (e.g., see all 3× values highlighted by block 610) and the carry in is a 0. When the previous digit is 2, 3, or 4, then the 3× value is respectively −4, −1, or 2 (e.g., see all 3× values highlighted by dotted block 620) and the carry in is a 1. When the previous digit is a 5, 6, 7, or 8, then the 3× value is respectively −5, −2, 1, or 2 (e.g., see all 3× values highlighted by dashed block 630) and the carry in is a 2. When the previous digit is a 9, then the 3× value is −3 (e.g., see the 3× value highlighted by doubled-dotted and dashed block 640) and the carry in is a 3.

Thus, as shown in rows three and four of table 600 (see block 650), one embodiment may operate such that when the previous digit does not provide a carry in (due to the previous digit being a 0 or 1), then the decimal number is tripled and SD recoded. As shown in rows five through seven of table 600 (see block 660), when the previous digit provides a carry in of '1' (due to the previous digit being a 2, 3, or 4), then the decimal number is tripled, SD recoded, and the carry in of '1' is added. As shown in rows eight through eleven of table 600 (see block 670), when the previous digit provides a carry in of '2' (due to the previous digit being a 5, 6, 7, or 8), then the decimal number is tripled, SD recoded, and the carry in of '2' is added. As shown in row twelve of table 600 (see block 680), when the previous digit provides a carry in of '3' (due to the previous digit being a 9), then the decimal number is tripled, SD recoded, and the carry in of '3' is added. Note that the ones digit remains after the SD recoding and adding, while and the tens digit is carried out (the smaller number preceding the ones digit represents the carry out).

In view of the above, an artisan would readily recognize that the technical effects and benefits of the system herein include, but are not limited to, an integration of management tools and processes into a single process managed. This integration further provides support for a mobile application that allows for field technicians to query (while in the field) using barcodes or other systems identifiers, which simplifies and streamlines the field process. In this way, status updates to orders and feedback to an ECA database create a closed loop process for strong process controls that improves a quality of operation of products and systems. Particularly, product and system failures can be reduced or eliminated via the system herein thereby providing longer and more efficient products/systems in the field.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method to produce a final product from a multiplicand and a multiplier, the method executed by a parallel decimal multiplication hardware architecture comprising a partial product generation hardware, a partial product tree, and a decimal adder, the method comprising:
   generating, by a partial product generation hardware of the parallel decimal multiplication hardware architecture, decimal partial products from the multiplicand and the multiplier, the partial product generation hardware comprising a 3× generator encodes one or more digits of the multiplicand during the generation of the decimal partial products;
   executing, by the partial product tree of the parallel decimal multiplication hardware architecture, a reduction of the decimal partial products to produce two corresponding partial product accumulations; and
   adding, by the decimal adder of the parallel decimal multiplication hardware architecture, the two corresponding partial product accumulations of the decimal partial products to produce the final product.

2. The method of claim 1, wherein the partial product generation hardware works in conjunction with a 4221 encoder of the parallel decimal multiplication hardware architecture to encode each digit of the multiplicand during the generation of the decimal partial products.

3. The method of claim 1, wherein the 3× generator scans two digits of the multiplicand when computing a current digit to resolve any carry in from a previous digit.

4. The method of claim 1, wherein the 3× generator forms a special carry term as a separate partial product when one of the decimal partial products cannot be resolved by any carries.

5. The method of claim 1, wherein the partial product generation hardware comprises a signed digit recoder that recodes each digit of the multiplier.

6. The method of claim 1, wherein the decimal partial products are coded in 4221 recoding.

7. The method of claim 1, wherein the two corresponding partial product accumulations are initially coded in 4221 recoding,
   wherein a first of the least two partial product accumulations is multiplied by two in a 2× multiplication hardware of the parallel decimal multiplication hardware architecture, shifted left 1-bit, and coded in binary coded decimal to provide a first binary coded decimal operand,
   wherein a second of the two partial product accumulations is recoded by binary coded decimal recoder to provide a second binary coded decimal operand, and
   wherein the first and second binary coded decimal operands are added to produce the final product.

8. A parallel decimal multiplication hardware architecture comprising:
   a partial product generation hardware;
   a partial product tree; and
   a decimal adder,
   the parallel decimal multiplication hardware architecture configured to produce a final product from a multiplicand and a multiplier by:
   generating, by partial product generation hardware, the partial product generation hardware and the parallel decimal multiplication hardware architecture, decimal partial products from the multiplicand and the multiplier;
   executing, by the partial product tree of the parallel decimal multiplication hardware architecture, a reduction of the decimal partial products to produce two corresponding partial product accumulations; and
   adding, by the decimal adder of the parallel decimal multiplication hardware architecture, the two corresponding partial product accumulations of the decimal partial products to produce the final product.

9. The parallel decimal multiplication hardware architecture of claim 8, wherein the partial product generation hardware works in conjunction with a 4221 encoder of the parallel decimal multiplication hardware architecture to encode each digit of the multiplicand during the generation of the decimal partial products.

10. The parallel decimal multiplication hardware architecture of claim 8, wherein the partial product generation hardware scans two digits of the multiplicand when computing a current digit to resolve any carry in from a previous digit.

11. The parallel decimal multiplication hardware architecture of claim 8, wherein the partial product generation hardware forms a special carry term as a separate partial product when one of the decimal partial products cannot be resolved by any carries.

12. The parallel decimal multiplication hardware architecture of claim 8, wherein the partial product generation hardware comprises a signed digit recoder that recodes each digit of the multiplier.

13. The parallel decimal multiplication hardware architecture of claim 8, wherein the decimal partial products are coded in 4221 recoding.

14. The parallel decimal multiplication hardware architecture of claim 8, wherein the two corresponding partial product accumulations are initially coded in 4221 recoding,
wherein a first of the least two corresponding partial product accumulations is multiplied by two in a 2× multiplication hardware of the parallel decimal multiplication hardware architecture, shifted left 1-bit, and coded in binary coded decimal to provide a first binary coded decimal operand,
wherein a second of the two corresponding partial product accumulations is recoded by binary coded decimal recoder to provide a second binary coded decimal operand, and
wherein the first and second binary coded decimal operands are added to produce the final product.

15. A system comprising:
a partial product generation hardware;
a partial product tree; and
a decimal adder,
the system configured to produce a final product from a multiplicand and a multiplier by:
generating, by partial product generation hardware, the partial product generation hardware, decimal partial products from the multiplicand and the multiplier;
executing, by the partial product tree, a reduction of the decimal partial products to produce two corresponding partial product accumulations; and
adding, by the decimal adder, the two corresponding partial product accumulations of the decimal partial products to produce the final product.

16. The system of claim 15, wherein the partial product generation hardware works in conjunction with a 4221 encoder to encode each digit of the multiplicand during the generation of the decimal partial products.

17. The system of claim 15, wherein the partial product generation hardware scans two digits of the multiplicand when computing a current digit to resolve any carry in from a previous digit.

18. The system of claim 15, wherein the partial product generation hardware forms a special carry term as a separate partial product when one of the decimal partial products cannot be resolved by any carries.

19. The system of claim 15, wherein the partial product generation hardware comprises a signed digit recoder that recodes each digit of the multiplier.

20. The system of claim 15, wherein the decimal partial products are coded in 4221 recoding.

* * * * *